United States Patent
Bridge et al.

(10) Patent No.: US 8,607,306 B1
(45) Date of Patent: Dec. 10, 2013

(54) BACKGROUND AUTO-SUBMIT OF LOGIN CREDENTIALS

(75) Inventors: Henry Bridge, Palo Alto, CA (US); Ben Goodger, Los Altos Hills, CA (US); Glen Murphy, Mountain View, CA (US); J. Nicholas Jitkoff, Mountain View, CA (US)

(73) Assignee: Google Inc., Mountain View, CA (US)

( * ) Notice: Subject to any disclaimer, the term of this patent is extended or adjusted under 35 U.S.C. 154(b) by 79 days.

(21) Appl. No.: 13/245,833

(22) Filed: Sep. 26, 2011

Related U.S. Application Data

(63) Continuation of application No. 12/943,688, filed on Nov. 10, 2010.

(51) Int. Cl.
 *G06F 17/00* (2006.01)
 *H04L 29/06* (2006.01)

(52) U.S. Cl.
 USPC .......................................................... 726/1

(58) Field of Classification Search
 USPC .......................................................... 726/1
 See application file for complete search history.

(56) References Cited

U.S. PATENT DOCUMENTS

| | | | |
|---|---|---|---|
| 6,564,257 B1 | 5/2003 | Emens et al. | |
| 7,010,582 B1 * | 3/2006 | Cheng et al. | 709/219 |
| 7,100,203 B1 * | 8/2006 | Tosey | 726/17 |
| 7,318,234 B1 | 1/2008 | Dharmarajan | |
| 7,330,876 B1 * | 2/2008 | Rawat et al. | 709/205 |
| 7,340,772 B2 * | 3/2008 | Panasyuk et al. | 726/15 |
| 7,467,402 B2 * | 12/2008 | Pennington et al. | 726/5 |
| 7,801,775 B1 * | 9/2010 | Roseman et al. | 705/26.1 |
| 7,921,208 B2 * | 4/2011 | Hochwarth et al. | 709/225 |
| 7,945,951 B2 * | 5/2011 | Yadav et al. | 726/21 |
| 8,024,781 B2 * | 9/2011 | Saunders et al. | 726/5 |
| 2003/0146850 A1 * | 8/2003 | Fallenstein | 340/901 |
| 2003/0182551 A1 | 9/2003 | Frantz et al. | |
| 2004/0122959 A1 * | 6/2004 | Lortz | 709/229 |
| 2004/0230647 A1 * | 11/2004 | Rawat | 709/203 |
| 2007/0115845 A1 * | 5/2007 | Hochwarth et al. | 370/252 |
| 2008/0289025 A1 | 11/2008 | Schneider | |
| 2009/0006850 A1 * | 1/2009 | Birger et al. | 713/169 |
| 2010/0146592 A1 * | 6/2010 | Gamare et al. | 726/4 |
| 2010/0306315 A1 | 12/2010 | Smith et al. | |
| 2010/0306547 A1 | 12/2010 | Fallows et al. | |
| 2011/0126001 A1 * | 5/2011 | Fu et al. | 713/156 |
| 2011/0126002 A1 | 5/2011 | Fu et al. | |

OTHER PUBLICATIONS

A. Roach, Session Initiation Protocol—Specific Event Notification, dynamicsoft, Jun. 2002, pp. 1-38.*
"PHP Login Script with Remember Me Feature," Jan. 25, 2004, retrieved from <http://www.evolt.org/node/60265>.

* cited by examiner

*Primary Examiner* — Peter Shaw
*Assistant Examiner* — Dao Ho
(74) *Attorney, Agent, or Firm* — McDermott Will & Emery LLP

(57) ABSTRACT

A method and system for automatically submitting login credentials as a background process for a user of a web service are provided. Login information corresponding to a login form of the web service is stored, where the login information comprises a login endpoint of the web service and the login credentials are used to authenticate the user for a session of the web service. A login token, generated by the web service, and its expiration date are tracked. The login credentials are then automatically submitted, without user intervention, to the web service based on the login endpoint and the expiration date of the login token.

17 Claims, 8 Drawing Sheets

BACKGROUND AUTO-SUBMIT OF LOGIN CREDENTIALS

CROSS-REFERENCE TO RELATED APPLICATION

This application is a continuation of application Ser. No. 12/943,688 filed Nov. 10, 2010 by BRIDGE, Henry et al. entitled BACKGROUND AUTO-SUBMIT OF LOGIN CREDENTIALS, the entire contents which is incorporated herein by reference and for priority is claimed under Title 35 U.S.C. §120.

BACKGROUND

1. Field

This present invention relates generally to the field of web browsers.

2. Background

The emergence and development of computer networks and protocols, including the World Wide Web (or simply "the web"), now allows users to take advantage of a wide variety of web applications and services provided by different web sites. Common examples of such web services include, but are not limited to, electronic messaging services, social networking applications, and personal banking services. Web users can enjoy convenient and secure access to such applications and services by simply browsing to a web site using a web browser. A web service generally requires a user to register an account in order to use the features provided by the service. Users provide login credentials associated with the account, such as, for example, a unique username and password combination via a login form displayed on a login page generated by the web service. A web user typically uses many different web services. Consequently, the user must remember and manage many different sets of login credentials, which can become very difficult. In addition, manually typing a username and password each time before using a web service can become very tedious.

Many existing web browsers and browser add-ons try to assist users with multiple sets of login credentials (e.g., usernames and passwords) for logging into different web services by storing login information and automatically filling it into login forms upon navigation to a login page. However, existing solutions cause confusion and delay for users when accessing their everyday accounts. For example, solutions that automatically submit the login page on navigation involve a series of automatic actions taking place on the page, which leads to confusion for the user. In addition, there are latencies associated with submitting login information via the login form, waiting for a server response, and redirecting the user to their desired page.

A more insidious problem relates to phishing scams involving web site forgeries with forged login pages used to fraudulently acquire sensitive information from users. A phishing web site is made to appear virtually identical to the web service provider's actual web site in order to lure unsuspecting users into submitting their login credentials to the phishing site. Once the login credentials are obtained, they can be used to gain access to the user's web service account, which may be, for example, the user's personal banking account. Although solutions that automatically fill in login credentials for users may not fill in the fields displayed on a forged login page of a phishing site, most users would believe the problem is with their browsers, rather than with the site itself, and consequently, choose to manually fill in the fields on the forged login page.

Thus, users need a capability to manage multiple sets of login credentials corresponding to different web services and be able to stay logged in at the web services without having to manually resubmit login credentials for each new session of a web service. Such users also need a capability to automatically submit login credentials as a background process without having to interact with or view a login page for each new session of the web service.

BRIEF SUMMARY

Embodiments relate to automatically submitting login credentials in the background for a user of a web service. In one embodiment, a computer-implemented method for automatically submitting login credentials in the background for a user of a web service is provided. Login information corresponding to a login form of the web service is stored in at least one memory. The login information comprises a login endpoint of the web service and the login credentials. The login credentials are used to authenticate the user for a session of the web service. A login token, which is associated with the session of the web service and includes an expiration date for the session, is tracked. The stored login credentials are then automatically submitted, without user intervention, to the web service based on the login endpoint and the expiration date of the login token, whereby the login token and the associated session are automatically renewed prior to the expiration date, and the user remains authenticated at the web service on a continuous basis, without any user intervention.

In another embodiment, a system for automatically submitting login credentials in the background for a user of a web service includes at least one memory, a login form manager, a login token manager, and an auto-submit module. The login form manager stores, in the at least one memory, login information corresponding to the web service. The login information comprises a login endpoint of the web service and the login credentials. The login credentials are used to authenticate the user for a session of the web service. The login token manager tracks a login token, which is associated with the session of the web service and includes an expiration date for the session. The auto-submit module automatically submits, without user intervention, the stored login credentials to the web service based on the login endpoint and the expiration date of the login token, whereby the login token and the associated session are automatically renewed prior to the expiration date, and the user remains authenticated at the web service on a continuous basis, without any user intervention.

Embodiments may be implemented using hardware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number. Further, the accompanying drawings, which are incorporated herein and form part of the specification, illustrate the embodiments of present invention and, together with the description, further serve to explain the principles of the invention and to enable a person skilled in the relevant art(s) to make and use the invention.

DETAILED DESCRIPTION

Figure 1:
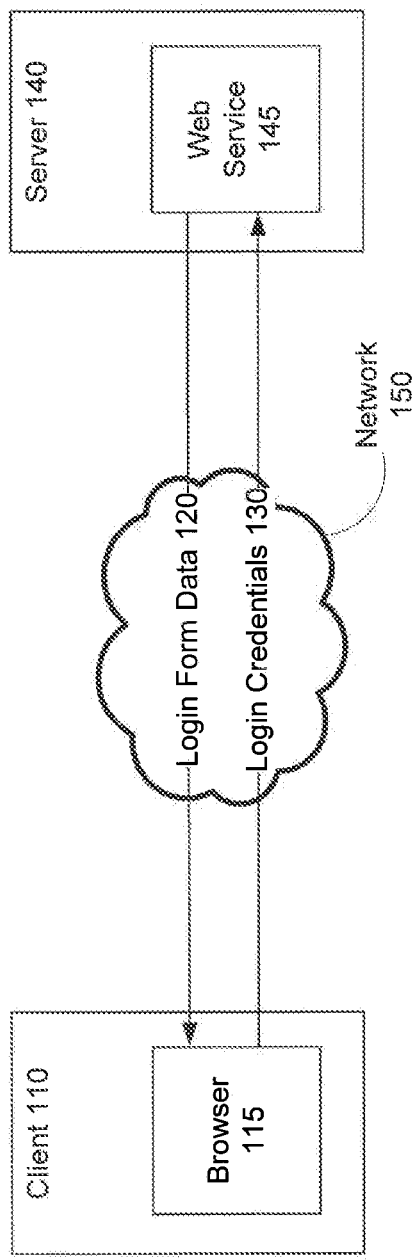
FIG. 1 is a diagram of an exemplary distributed system in which embodiments can be implemented.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "web browser" and "browser" are used interchangeably herein to refer broadly and inclusively to any web browsing application, protocol, framework, or service as would be apparent to a person skilled in the art given this description. An example web browser that may be adapted to incorporate embodiments as described herein includes, but is not limited to, the Google Chrome browser from Google Inc. of Mountain View, Calif.

The terms "web service" and "web application" are used interchangeably herein to refer broadly and inclusively to any web site, application, service, protocol, or framework that allows uses to log in and perform various tasks via a web browser over a local area network, medium area network, and/or wide area network such as the Internet network, such as the Internet. Examples of such web services and/or applications include, but are not limited to, electronic messaging services, social networking applications, and personal banking services.

TABLE OF CONTENTS

I. Introduction
II. System Overview
III. Background Auto-Submit of Login Credentials
IV. Detection of Login Token Removal Prior to Expiration
V. Method
   A. Initial Storage of Login Information
      1. Determining Session and/or Login Token Expiration
      2. Determining Login Endpoint(s)
      3. Associating and Storing Login Information
   B. Automatically Submitting Login Credentials in the Background
   C. Detecting Removal of Login Token Prior to Expiration
VI. Example Computer System Implementation
VII. Variations
VIII. Conclusion I. Introduction Embodiments relate to automatically submitting login credentials in the background (i.e., as a background process) for a user of a web service. A web service typically requires a user to provide login credentials, such as, for example, a unique username and password combination, via a login form to use the service. The login form is displayed on a login page generated by the web service and displayed within a content display area of the user's web browser. A user typically navigates to the login page by entering a location address such as a uniform resource locator (URL) of the login page into a user field of the web browser. A login form generally contains data fields, into which the user must enter particular login credential information associated with the user's account for the particular web service. The user's login credentials are submitted by the browser to the web service in order to authenticate the user at the web service.

The web service then checks the submitted login credentials against known credentials associated with a user account registered with the web service and stored at, for example, a server used by the web service. The user is either provided access to web service features, if the user is successfully authenticated with the login credentials, or shown an error message (e.g., a "login failed" error message that may be displayed either in the browser or a separate window). Once the user is authenticated, the web service typically generates one or more tokens, including a login token, that gets stored on the user's computing device. Such tokens can be any type of data file or set of data objects that can be stored at the user's computing device. An example of a token includes, but is not limited to, a web or browser cookie.

The login token, in particular, is a data file that is used by the browser to authenticate the user each time the user attempts to use the web service. The data or parameters within a login token may include, but is not limited to, a name, a directory path of the web service, a web domain of the web service, and an expiration date. Such parameters can be used to identify and associate a login token with the web service that generated it. The expiration date is generally predetermined by each web service and associated with a session of the web service. A session of a web service can correspond to any period of time in which the user is authenticated and thus, permitted access to features and services offered by the web service. Login tokens generally persist on the user's computing device until they expire.

The user is permitted access to the web service and its features without having to submit login credentials via the login page as long as the login token (and the session) have not expired. However, once the login token expires, the user's browser will delete it from the user's computer and the login credentials will have to be resubmitted once again to authenticate the user. Embodiments enable tracking login tokens associated with various web services used by the user and automatically submitting, without user intervention, login credentials to the appropriate web service upon the expiration of a session/login token, thereby renewing the web service session and login token.

II. System Overview

FIG. 1 is a diagram of a distributed system 100 suitable for practice of an embodiment of the invention. In the example shown in FIG. 1, system 100 includes a client 110, a browser 115, login form data 120, login credentials 130, a server 140, a web service 145, and a network 150.

Client 110 communicates with server 140 over network 150. Client 110 can be any type of computing device with at least one processor, local memory, display, and one or more input devices (e.g., a mouse, QWERTY keyboard, touch-screen, microphone, or a T9 keyboard). Such computing device can include, but is not limited to, a mobile phone, a personal digital assistant (PDA), a computer, a cluster of computers, a set-top box, or other similar type of device capable of processing instructions. Similarly, server 140 can be implemented using any type of computing device capable of serving data to client 110.

Network 150 can be any network or combination of networks that can carry data communication. Such network can include, but is not limited to, a wired (e.g., Ethernet) or a wireless (e.g., Wi-Fi and 3G) network. In addition, network 150 can include, but is not limited to, a local area network, medium area network, and/or wide area network such as the Internet. Network 150 can support protocols and technology including, but not limited to, Internet or World Wide Web protocols and/or services. Intermediate network routers, gateways, or servers may be provided between components of communication system 100 depending upon a particular application or environment.

Client 110 executes browser 115. Browser 115 can be any type of web browser or similar application. Browser 115 requests web pages generated by one or more web sites, including sites that host web services. The location of a web site or web service is identified by a location address, such as a URL, that can be entered by a user (not shown) at browser 115 into a web address field of browser 115. Server 140 executes a web service 145. Web service 145 may be any type of web service or application, as described above, that a user can access using web browser 115 over network 150. For example, the user at browser 115 may enter the URL of web service 145 into browser 115 to navigate to web pages generated by web service 145.

Although only server 140 is shown, additional servers may be used as necessary depending on the implementation of a particular web service. Similarly, although only web service 145 is shown in system 100, any number of web services may be used as necessary. For example, web service 145 may be any one of various web services and applications executed by server 140. Web services and applications may also include computer software applications that are hosted in the browser. For example, such services and applications may be implemented as a Java applet or using a browser-supported language including, but not limited to, JavaScript, VBScript, Hyper Text Markup Language (HTML), or any other type of language for writing web services and/or applications.

In an embodiment, browser 115 requests web pages, including a login page, from web service 145 over network 150 using one or more well known communication protocols such as, for example, Hypertext Transfer Protocol (HTTP). The web pages are displayed by browser 115 in a content display area of browser 115. The web pages are viewed by a user on a display or rendering device (not shown) coupled to client 110. Such a display or rendering device can include, but is not limited to, a cathode ray tube (CRT) monitor or liquid crystal display (LCD) screen. The user can interact with browser 115 to perform various tasks such as, for example, directing the browser to different web pages and entering data into user fields on the web pages displayed in the content area of browser 115. Browser 115 receives user input from one or more input devices (not shown), such as, for example, a mouse, keyboard, or touch screen, coupled to client 110.

As illustrated in FIG. 1, browser 115 receives login form data 120 from web service 145 of server 140 over network 150. For example, login form data 120 may include a login page, generated by web service 145, in response to a request for the login page from browser 115. In addition, login form data 120 may also include configuration information pertaining to web service 145 in a relevant file format compatible with browser 115. The request from browser 115 is initiated as the user navigates to the login page of web service 145 (e.g., by entering a URL of web service 145 in browser 115). The login page is displayed at browser 115 and includes a login form comprising login fields, one or more user interface elements, and other visual content.

The login fields may be used by the user to enter login information, such as, for example, login credentials (e.g., username and password). Examples of user interface elements include, but are not limited to, control buttons, links, dropdown lists, and any other type of control or user interface element that can be used by the user to direct input or information to web service 145. For example, the user may use a keyboard coupled to client 110 to enter login credentials (e.g., a username and password) into respective username and password fields displayed on the login form. The user may then use a mouse, also coupled to client 110, to submit the entered login credentials to web service 145 by selecting a control button labeled, for example, "log in" also displayed on the login form. The login credentials may be included in, for example, login credentials 130. As illustrated in FIG. 1, browser 115 submits login credentials 130 to web service 145 over network 150, thereby authenticating the user at web service 145. Once authenticated, the user is allowed access to features and services provided by web service 145.

In an embodiment, login form data 120 also includes one or more login endpoints of web service 145. Such a login endpoint can be any type of consistent or dedicated interface exposed by web service 145, to which browser 115 can submit structured data to perform common actions. For example, browser 115 can use the login endpoint of web service 145 to submit login credentials 130 to web service 145. A login endpoint can include, but is not limited to, a combination of an Internet Protocol (IP) address and a communication port, a URL, or any other type of communication interface.

III. Background Auto-Submit of Login Credentials

Figure 2:
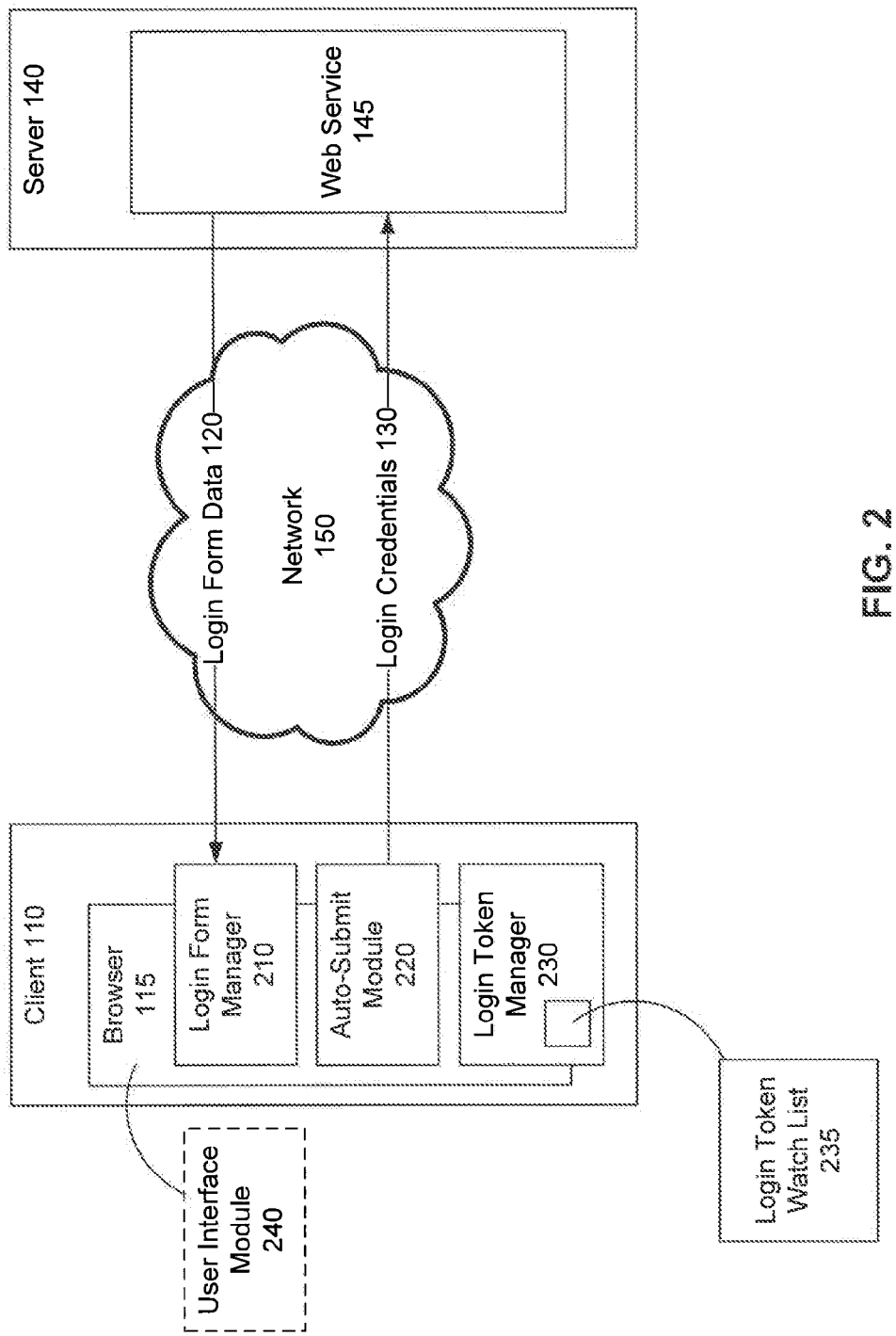
FIG. 2 is a diagram illustrating an example of how a system for automatically submitting login information in the background for a user of a web service may be integrated with a web browser, according to an embodiment.

FIG. 2 illustrates system 200, including an example of how a system for automatically submitting login credentials in the background for a user of a web service may be integrated with browser 115 of FIG. 1, according to an embodiment. In the example shown in FIG. 2, system 200 includes a login form manager 210, an auto-submit module 220, a login token manager 230, and a login token watch list 235. In an embodiment, system 200 also includes a user interface module 240.

Login form manager 210, auto-submit module 220, login token manager 230 (including login token watch list 235), and user interface module 240 can be implemented in software, firmware, hardware, or any combination thereof. Embodiments of login form manager 210, auto-submit module 220, login token manager 230 (including login token watch list 235), and user interface module 240, or portions thereof, can also be implemented to run on any type of processing device including, but not limited to, a computer, workstation, embedded system, networked device, mobile device, or other type of processor or computer system capable of carrying out the functionality described herein.

Further, login form manager 210, auto-submit module 220, login token manager 230 (including login token watch list 235), and user interface module 240 can be integrated within browser 115 or can be implemented as separate components from browser 115. For example, login form manager 210, auto-submit module 220, login token manager 230 (including login token watch list 235), user interface module 240, or any combination thereof may be implemented as an extension or add-on of browser 115.

Browser 115 requests a login page from web service 145 if the user has not previously been authenticated for web service 145 (e.g., if this is the first time the user is logging into web service 145). Although only web service 145 is shown in system 200, any number of web services may be used as necessary. For example, a user at client 110 may use a multitude of web services via browser 115. For ease of explanation, the operation of system 200 will primarily be discussed in the context of web service 145.

As described above, web service 145, generates the requested login page and sends it to browser 115 over network 150. For example, the login page may be included in login form data 120. Upon receiving the login page from web service 145, browser 115 can display the login page in a content area of browser 115. The displayed login page may include a login form with one or more login fields. The user at browser 115 may then enter login credentials into the login fields using a user input device (not shown), such as a keyboard or touch screen coupled to client 110. In an embodiment, login form manager 210 stores login information associated with the login form of web service 145 at client 110, for example, in a memory device coupled to client 110. The login information stored by login form manager 210 includes the login credentials entered by the user and one or more login endpoints, such as, for example, a URL, of web service 145.

In an embodiment, login form manager 210 determines one or more login endpoints of web service 145 by receiving the login endpoint(s) from web service 145. For example, the login endpoint(s) may be included in login form data 120. In an embodiment, login form manager 210 uses heuristics to determine the login endpoint(s). A person skilled in the relevant art given this description would appreciate that any number of well-known heuristic algorithms may be employed by login form manager 210 to determine the login endpoint(s) of web service 145. In another embodiment, login form manager 210 uses a special cases list to determine the login endpoint(s) of web service 145. For example, the special cases list may comprise pairs of URLs and login endpoints, in text data format, corresponding to various web services, including web service 145, used by the user at browser 115. In an embodiment, the special cases list is stored at client 110, for example, in a memory device coupled to client 110. For example, login form manager 210 may determine the login endpoint(s) of web service 145 by using the URL for web service 145 as an index for the special cases list to find the login endpoint corresponding to the URL of the web service in the special cases list. The URL for web service 145 may be the URL entered by a user (e.g., to navigate to web service 145) at browser 115.

In a further embodiment, login form manager 210 retrieves the special cases list from a third-party web service and stores the retrieved list at client 110 (e.g., in a memory device coupled to client 110) prior to access. In an embodiment, the third-party service is cloud-based. Such a cloud-based service can be any computing resource or service, provided by one or more cloud computing devices, shared over a network. Such computing resources can include, but are not limited to, one or more storage devices that are integrated with or separate from the cloud computing devices. Examples of cloud computing devices include, but are not limited to, a central processing unit, an application-specific integrated circuit, or other type of cloud computing device having at least one processor and memory. Cloud services performed by the one or more cloud computing devices include, but are not limited to, information storage and retrieval. Other cloud services that could be performed by cloud computing devices would be apparent to a person of ordinary skill in the relevant art. In addition, the advantages to using cloud services, such as a cloud-based third-party service for obtaining a special cases list comprising different types of information corresponding to various web services, would be apparent to a person of ordinary skill in the relevant art.

As described in further detail below, to authenticate the user at web service 145, auto-submit module 230 automatically submits the login credentials entered by the user in the login form displayed at browser 115 to web service 145 over network 150. For example, the login credentials may be included in login credentials 130. In an embodiment, web service 145 generates one or more tokens, including a login token, upon user authentication. The tokens are transmitted by web service 145 to browser 115 over network 150. For example, the generated tokens may be included in login form data 120. Once received at browser 115, the tokens can be stored, for example, by login form manager 210 at client 110. As described above, such tokens can be any type of data file or set of data objects that can be stored at client 110, for example, in a memory of client 110 for later access by browser 115, including its components. Browser 115 can use the information within the tokens for various purposes including, but not limited to, authentication at web service 145, storing preferences related to web service 145, and tracking sessions of web service 145.

In particular, the login token generated by web service 145 is used by browser 115 for user authentication and tracking sessions of web service 145. In general, the login token is associated with a session of web service 145. As described above, the session can correspond to any period of time in which the user is authenticated and thus, permitted access to features and services offered by a web service such as web service 145. In an embodiment, the login token includes an expiration date or time (or simply "expiration") which also corresponds to the expiration of the session of web service 145. Such a session (and token) expiration is generally predetermined by web service 145. For example, different web services may generate their own login tokens with different session expirations, which may be stored at client 110. Expired login tokens are generally detected and deleted by browser 115.

In an embodiment, login form manager 210 associates the login token generated by web service 145, the URL of web service 145, login credentials used to authenticate the user at web service 145, and login endpoints used to submit the login credentials to web service 145. Further, login form manager 210 stores the association between the login token, URL, login credentials, and login endpoints at client 110, for example, in memory of client 110. Once the association is stored by login form manager 210, the it may be accessed for various purposes by login form manager 210, auto-submit module 220, login token manager 230, or any combination thereof. Once a login token (and session) of web service 145 has expired and is thus deleted from client 110 by browser 115, login form manager 210 can delete or modify the association as necessary. For example, login form manager 210 can either remove the expired login token from the association while maintaining the association between the URL, login credentials, and login endpoints corresponding to web service 145 for future use.

In an embodiment, login token manager 230 determines which of the received and/or saved tokens are login tokens. It would be apparent to a person skilled in the art given this description how login token manager 230 determines whether a received token is a login token. For example, login token manager 230 may examine the data and parameters of each token to determine whether the token includes information generally associated with a login token. Such information may include, but is not limited to, session identification information, a username and password used to authenticate the user at web service 145, and an expiration date for a session of web service 145.

In an embodiment, login token manager 230 tracks the login tokens at client 110 using login token watch list 235. In a further embodiment, login token manager 230 uses login token watch list 235 to determine the expiration of web service sessions and login tokens. As will be described in further detail below, once the login token and session of web service 145 has expired, the user's login credentials will once again be submitted to web service 145. In an embodiment, login token watch list 235 is a file, for example, in text data format, stored at client 110. Login token watch list 235 includes a list of all of the persistent login tokens stored at client 110 and used by browser 115 to authenticate the user with a particular web service, including, for example, web service 145.

In an embodiment, upon determining that a token is a login token, login token manager 230 adds the login token to login token watch list 235. In this embodiment, the login token is stored as a separate file in memory at client 110 and also as an entry within login token watch list 235. In a different embodiment, login token manager 230 adds a memory pointer, which specifies the location of the login token at client 110, to login token watch list 235. Such a memory pointer can include, but is not limited to, a relative memory address of the stored login token. In this embodiment, the login token is stored as a separate file in memory at client 110 while a pointer corresponding to the memory location of the login token at client 110 is stored in login token watch list 235. In addition, to ensure that the memory pointer is pointing to the same login token in memory, login token manager 230 may also associate a login token identifier with the memory pointer within login token watch list 235. The identifier may include, but is not limited to, a pathname, domain, session identifier, or any combination thereof, that is included in the login token itself. The form, function, and use of such memory pointers would be apparent to a person skilled in the relevant art given this description.

Further, it would be apparent to a person skilled in the art given this description that login token watch list 235 may be adapted as necessary to implement various embodiments. In an example, login token watch list 235 may comprise pairs of URLs and login tokens (or pointers to login token memory locations), corresponding to different web services, including web service 145. In another example, each login token, within login token watch list 235, itself includes the URL of its associated web service. In an embodiment, the URL for web service 145 is used by login token manager 230 as an index to access login token watch list 235. For example, login token manager 230 may use the URL entered by a user (e.g., to navigate to web service 145) at browser 115 to find the corresponding login token in login token watch list 235 (e.g., within login token watch list 235 if login token watch list 235 includes the login token itself or at client 110 if login token watch list 235 includes a pointer to the login token in memory).

In an embodiment, login token manager 230 uses heuristics to determine the expiration date of web service sessions. A person skilled in the relevant art given this description would appreciate that any number of well-known heuristic algorithms may be employed by login token manager 230 to determine session expirations. In yet another embodiment, login token manager 230 can use a special cases list to determine the session expiration. Such a special cases list may comprise pairs of URLs and session expirations, for example, in text data format, corresponding to various web services, including web service 145. In an embodiment, the special cases list is stored at client 110, for example, in a memory of client 110.

For example, login token manager 230 may determine the session expiration using the stored special cases list by using the URL of web service 145 as an index for the special cases list in order to find the corresponding login token and expiration. The URL for web service 145 may be the URL entered by a user (e.g., to navigate to web service 145) at browser 115. In an embodiment, login token manager 230 retrieves the special cases list from a third-party web service and stores the retrieved list at client 110 (e.g., in a memory of client 110) prior to accessing the list. In a further embodiment, such a third-party service is cloud-based, as described above.

In another embodiment, login token manager 230 checks a stored special cases list, as described above, to find a matching URL for web service 145. Likewise, login token manager 230 may check the special cases list each time the user tries to navigate to web service 145 using browser 115 or on a predetermined periodic basis. If login token manager 230 finds a match in the special cases list, login token manager 230 uses the special case as the session or login token expiration value. However, if login token manager 230 does not find a match in the special cases list, login token manager 230 may then use heuristics, as described above, to determine the session and login token expiration corresponding to web service 145.

To determine whether a login token (and web service session) has expired, login token manager 230 can compare the expiration of the login token with a current date or time value. In an example, the current date or time value may be derived by login token manager 230 from an internal or system clock (not shown) coupled to client 110. In another example, the current date or time value may be derived from an online service accessible by login token manager 230 over network 150. In an embodiment, login token manager 230 removes expired login tokens (and/or memory pointers to expired login tokens that have been deleted by browser 115) from login token watch list 235.

In an embodiment, login token manager 230 can check whether a session of web service 145 has expired each time the user attempts to navigate to web service 145 using browser 115. Alternatively, login token manager 230 can check for session expiration on a predetermined periodic basis or according to a predetermined schedule. For example, the predetermined basis or schedule may be configured by the user via a user setting or option of browser 115. Thus, in an embodiment, login token manager 230 accesses login token watch list 235 either each time the user attempts to navigate to web service 145 using browser 115 or on a predetermined periodic basis.

In an embodiment, once login token manager 230 determines that the login token or session of web service 145 has expired (e.g., using login token watch list 235, heuristics, or a special cases list), auto-submit module 220 is configured to automatically submit, without user intervention, the stored login credentials associated with the login token, to web service 145 over network 150. For example, auto-submit module 220 may use login credentials 130 to submit the stored login credentials. Auto-submit module 220 submits the login credentials as a background operation or process, in which the actual submission of login credentials to web service 145 over network 150 remains transparent from the user's perspective. Further, the login credentials are submitted by auto-submit module 220 to a login endpoint of web service 145. In an embodiment, web service 145 may have one or multiple login endpoints that are determined by login form manager 210, as described above.

Upon receiving the login credentials from auto-submit module 220, web service 145 generates new tokens, including a new login token. The new login token corresponds to a new session of web service 145 and therefore, has a new expiration. Web service 145 then sends the new tokens to browser 115 over network 150. The received tokens are saved by browser 115 at client 110 for later access. In an embodiment, login token manager 230 determines which of the received and/or saved tokens is a login token, as described above. In an embodiment, login token manager 230 can then track the new login token and its expiration by adding the login token to login token watch list 235. Login token manager 230 may also use heuristics and/or a special cases list to track the expiration of the new login token and the new session of web service 145. In an embodiment, login form manager 210 associates the new login token, URL, login credentials, and login endpoints corresponding to web service 145, as described above.

In an embodiment, user interface module 240 displays a login option or control that allows the user to either enable or disable the automatic submission of login credentials by auto-submit module 220. A person skilled in the art given this description would recognize a number of well-known ways to implement the login option to disable or enable auto-submission of login credentials in browser 115. For example, this login option may be a graphic control, such as a button or checkbox, displayed by user interface module 240 outside the content display area of browser 115, such as on a toolbar area of browser 115 or within a configuration or settings panel. The user can then enable or disable the auto-submission of login credentials by activating or deactivating the control, respectively, using a user input device, such as a mouse or keyboard. User interface module 240 receives the user input and places auto-submit module 220 in an active or inactive operational state, depending on the received input.

In an embodiment, user interface module 240 enables an auto-submit or "stay logged in" feature of browser 115 by displaying a message at browser 115 that asks the user whether the user would like to stay logged in to web service 145. If the user selects an affirmative response, login credentials will be automatically submitted to web service 145, without user intervention, using auto-submit module 220. For example, the default configuration of browser 115 may be to have the automatic submission of login credentials disabled. Thus, the message may be displayed when the user tries to submit login credentials to web service 145 using the associated login form either the first time the user navigates to the login page/form or after a login token has expired or has been deleted. The message may be displayed, for example, in a separate dialog window of browser 115 and include control buttons that the user can select to either enable the auto-submit feature or not.

IV. Detection of Login Token Removal Prior to Expiration

In an embodiment, login token manager 230 is configured to detect whether the login token corresponding to web service 145 has been removed or deleted from client 110 prior to its expiration. For example, the login token may have been deleted from the memory of client 110 by the web service, browser 115, and/or the user for various reasons. In an example, browser 115 may have a user option that when selected invokes browser 115 to remove all tokens (e.g., browser cookies) from memory of client 110. In another example, the user may have either voluntarily or involuntarily "logged out" of the web service, in which case the user is no longer authenticated at the web service and the current session of web service is completed. For example, the user may be involuntarily logged out by web service 145 if the user's account (or login credentials) associated with web service 145 has expired and thus, the user's login credentials can no longer be used to authenticate the user at web service 145.

In an embodiment, login token manager 230 can detect the removal or deletion of a login token prior to its expiration by using login token watch list 235. For example, each time login token manager 230 accesses login token watch list 235 to determine login token expiration (e.g., each time the user tries to navigate to web service 145), login token manager 230 may also use login token watch list 235 to detect whether a login token is still actually located at client 110 (e.g., still present in memory of client 110). Since login tokens are deleted by browser 115 upon expiration, any login tokens or pointers to login tokens that are still in login token watch list 235 but that are not present in memory have been removed or deleted prior to expiration. For example, as described above in an embodiment, login token watch list 235 includes the login token, which was generated by web service 145 and stored at client 110. Thus, upon accessing the login token using login token watch list 235, login token manager 230 can also perform a search of the login token at client 110. If login token manager 230 is unable to find the login token at client 110, then it has determined that the login token has been deleted or removed prior to its expiration.

The login credentials, stored at client 110 and submitted by auto-submit module 220, include account information associated with a particular account of the user at web service 145. For example, web service 145 may have required the user to register an account in order to use web service 145. In addition, in order for the user to access web service 145 using the registered user account may, the login credentials (e.g., a username and password) associated with the account must be submitted to web service 145. Further, the stored login credentials may include different sets of account information associated with multiple user accounts. For example, the user accounts may be associated with a single user of browser 115 at client 110, who may have registered multiple accounts with web service 145, or with multiple users of browser 115 at client 110, who each have a different account registered with web service 145. In either instance, the login credentials for each account can be submitted to web service 145 to authenticate a particular user.

In an embodiment, if login token manager 230 determines that the login token has been deleted prior to its expiration, login form manager 210 can determine whether the login credentials stored at client 110 include additional user account information that may correspond to another account the user has registered with web service 145, as described above. In an embodiment, user interface module 240 displays an alternative login option for the user if login form manager 210 determines that additional user account information is available at client 110. User interface module 240 thereby enables the user at browser 115 to select being authenticated at (or logging into) web service 145 using additional user account information associated with other user accounts that may be available. User interface module 240 may display the login option either within the content display area of browser 115 or in a separate window. For example, the login option may notify the user of account information related to a second account and allow the user to select the second account to log in to web service 145. The login option may include additional graphic controls (e.g., dropdown list, radio buttons, etc.), displayed at browser 115 by user interface module 240, as may be necessary.

The user can specify the desired login option by using a user input device (e.g., a mouse or keyboard) coupled to client 110. User interface module 240 can then receive the user selected login option and depending on the received option, display the original login form of the login page associated with web service 145. For example, if the user selects the option to log in using the second account information, user interface module 240 does not display the login form and auto-submit module 220 submits the login credentials (e.g., in login credentials 130) associated with the second account information to web service 145 over network 150. However, if the user selects the option not to log in using the second account information, user interface module 240 will display the login form. In addition, login token manager 230 will remove the login token (or login token pointer) from login token watch list 235. This ensures that any saved login credentials are not submitted to web service 145 if the user has logged out or expressed an intent to not have login credentials automatically submitted (e.g., by disabling the auto-submit feature of browser 115 as, described above). Similarly, if login form manager 210 determines that additional account information is not available at all, user interface module 240 will automatically, without user intervention, direct the user to the original login form of web service 145, and login token manager 230 will remove the login token from login token watch list 235.

V. Method

A. Initial Storage of Login Information

Figure 3:
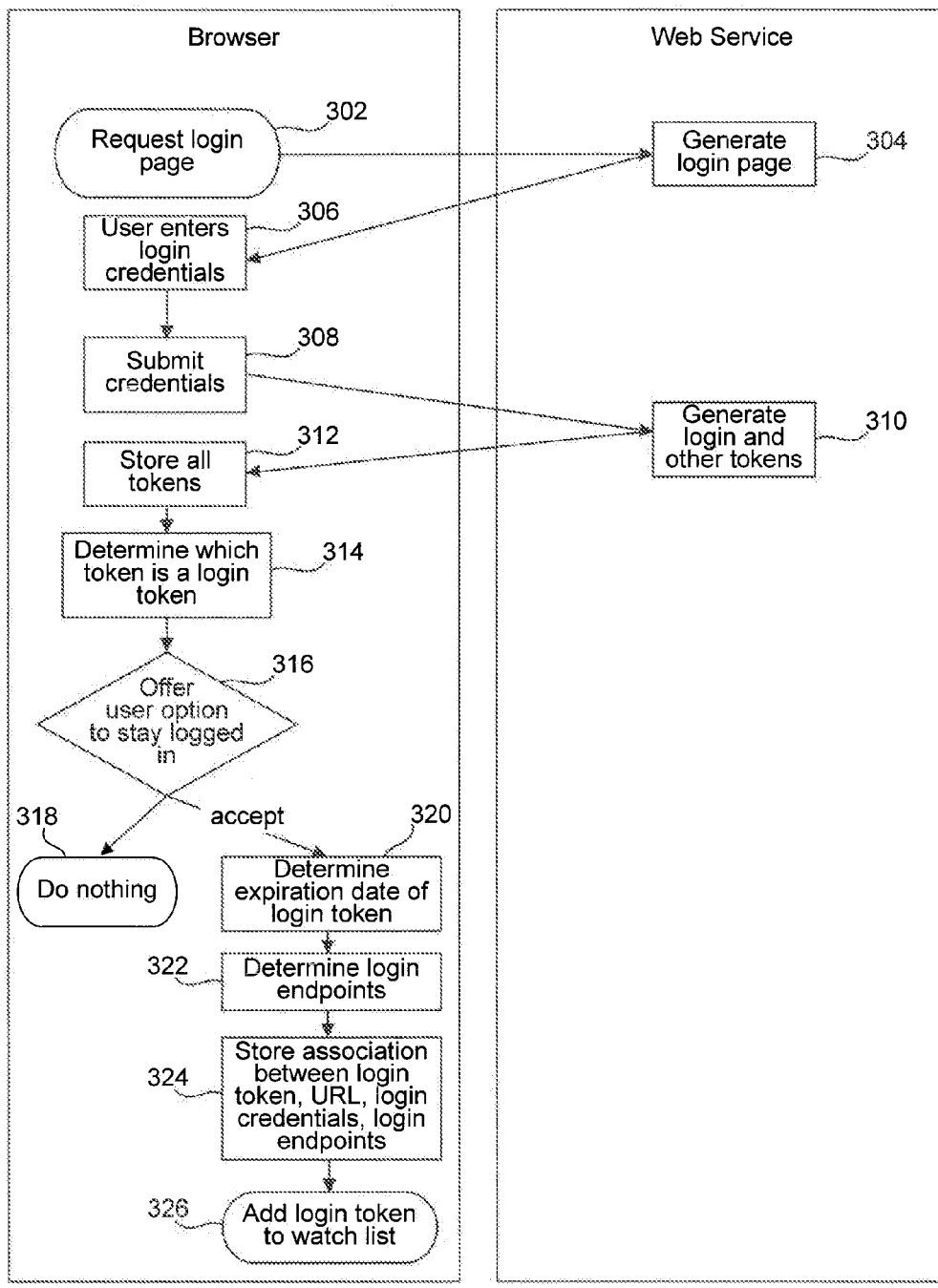
FIG. 3 is a process flowchart of an exemplary method for storing login information corresponding to a login form of a web service, according to an embodiment.

FIG. 3 is a process flowchart of an exemplary method 300 for storing login information corresponding to a login form of a web service, according to an embodiment. Method 300 includes steps 302, 304, 306, 308, 310, 312, 314, 316, 318, 320, 322, 324, and 326. Method 300 may be executed, for example, the first time a user tries to use the web service. One benefit of method 300 is that it enables stored login credentials to be automatically submitted, without user intervention, to a web service, as will be described in further detail below with respect to method 800 of FIG. 8.

For ease of explanation, system 200 of FIG. 2, as described above, will be used to describe method 300, but is not intended to be limited thereto. Further, for ease of explanation, steps 302, 306, 308, 312, 314, 316, 318, 320, 322, 324, and 326 will be described in the context of browser 115 of system 200, and steps 304 and 310 will be described in the context of web service 145 of system 200, but is not intended to be limited thereto. Based on the description herein, a person of ordinary skill in the relevant art will recognize that method 300 can be executed on any type of client device including, for example and without limitation, a PDA, a laptop or personal computer, and similar types of devices capable of executing a web browser that can access features of web applications/services over a network, such as the Internet.

Method 300 begins in step 302, which includes requesting a login page from a web service (e.g., web service 145). Step 302 may be performed by, for example, browser 115. The login page is requested when the user at browser 115 navigates to web service 145 by, for example, entering the URL of web service 145 into the appropriate user field of browser 115. Method 300 then proceeds to step 304, which includes generating the login page as requested in step 302. Step 304 may be performed by, for example, web service 145. Upon generating the login page, the page is sent from, for example, web service 145 to browser 115 via network 150 and displayed in a content area of browser 115. In step 306, the user at browser 115 enters login credentials into login fields located in a login form of the displayed login page. In step 308, the entered login credentials are submitted to web service 145. Step 308 may be performed by, for example, auto-submit module 220. Next, in step 310, one or more tokens, including a login token, are generated. Step 310 may be performed by, for example, web service 145. The generated tokens are sent from web service 145 to browser 115 via, for example, network 150.

Method 300 then proceeds to step 312, which includes saving all the tokens received from the web service. In step 314, the saved tokens are examined in order to determine which tokens are login tokens. As described above, each web service used by the user at browser 115 may generate its own login token that gets saved at client 110. In step 316, the user is offered an option to stay logged into the web service. If the user selects the option to stay logged in, the auto-submit feature of the browser is activated and method 300 proceeds to step 320, which includes determining the expiration date of the login token. However, if the user does not accept the option to stay logged in, method 300 concludes at step 318. Steps 312, 314, and 320 may be performed by, for example, login token manager 230. Step 316 may be performed by, for example, user interface module 240.

1. Determining Session and/or Login Token Expiration

As described above, the login token is associated with a session of the web service. The session and the login token have an expiration date that is predetermined by the web service. Since each login token generated by the web service is associated with a session of the web service, the expiration of a single session of web service is the same as the expiration of a login token. The expiration date of the login token and session of the web service may be determined in step 320 in a number of different ways. In an embodiment, the expiration date of the login token may be determined by using a login token watch list (e.g., login token watch list 235), as described above. The expiration date may also be determined without using a login token watch list, according to other embodiments.

Figure 4:
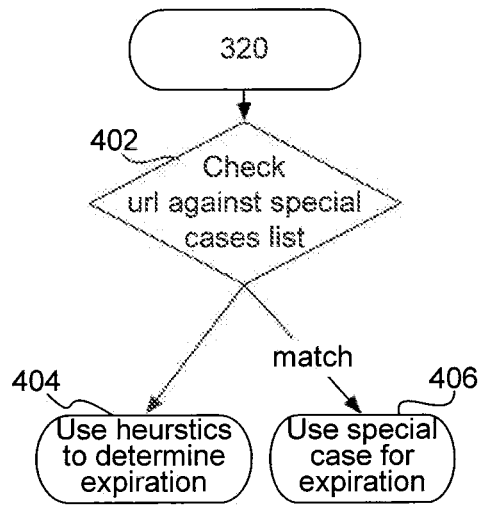
FIG. 4 is a process flowchart of an exemplary method for determining the expiration of web service sessions and/or login tokens using heuristics or a special cases list, according to an embodiment.

FIG. 4 is a process flowchart of an exemplary method 400 for determining the expiration of web service sessions and login tokens using heuristics or a special cases list, according to an embodiment. Method 400 includes steps 402, 404, and 406. For ease of explanation, method 400 is described in the context of system 200, particularly browser 115, of FIG. 2. Method 400 begins in step 402, which includes checking the URL of the web service against a special cases list of session/token expirations for various web services. For example, the special cases list may comprise pairs of URLs and session expirations, in which each URL and session expiration pair corresponds to a different web service. The checking in step 402 may include searching the special cases list for a matching URL that corresponds to a particular web service (e.g., when the user navigates to web service 145 by entering the URL of web service 145 in browser 115). If the matching URL for the web service is found in the special cases list, method 400 proceeds to step 406, which includes using the special case as the determined expiration of the session and login token. However, if the matching URL is not found in the special cases list, method 400 proceeds to step 404, which includes using heuristics to determine the expiration of session and login token. Steps 402, 404, and 406 may be performed by, for example, login token manager 230.

Figure 5:
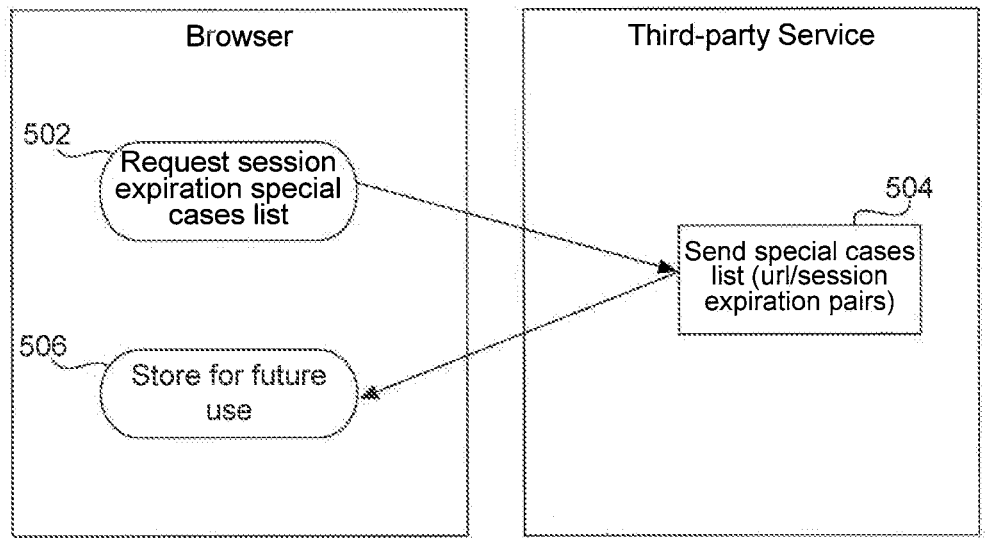
FIG. 5 is a process flowchart of an exemplary method for updating a special cases list of session and/or login token expirations using a third-party service, according to an embodiment.

As described above, the special cases list of web service session expirations can be retrieved from a third-party service via, for example, network 150. FIG. 5 is a process flowchart of an exemplary method 500 for updating a special cases list of session expirations using such a third-party service, according to an embodiment. Method 500 includes steps 502, 504, and 506. Method 500 begins in step 502, which includes requesting a special cases list from the third-party service. Step 502 may be performed by, for example, login token manager 230 of FIG. 2 via network 150. In step 504, in response to the request, the special cases list is sent by the third-party service to, for example, login token manager 230. Once the special cases list is received, it is stored for future use in step 506, which may be performed by, for example, login token manager 230. In an embodiment, the third-party service is a cloud-based service, as described above.

Based on the description herein, a person of ordinary skill in the relevant art will recognize that methods 400 and 500 can be executed on any type of client device including, for example and without limitation, a PDA, a laptop or personal computer, and similar types of devices capable of executing a web browser that can access features of web applications/services over a network, such as the Internet.

2. Determining Login Endpoint(s)

Referring back to FIG. 3, once the expiration dates of the login tokens and web service sessions have been determined in step 320, method 300 proceeds to step 322, which includes determining one or more login endpoints for the web service. The login endpoints of the web service may be determined in a number of different ways, as described above.

Figure 6:
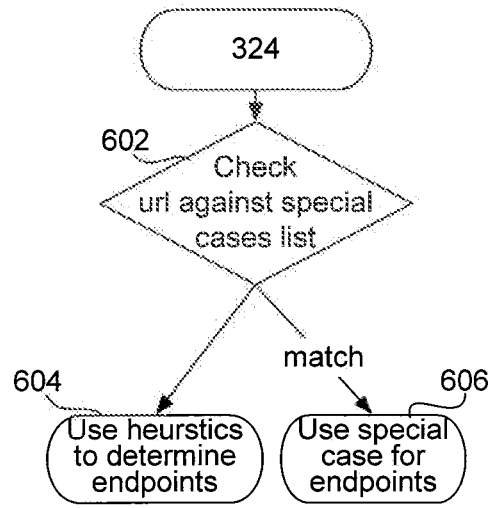
FIG. 6 is a process flowchart of an exemplary method for determining login endpoints of a web service using heuristics or a special cases list, according to an embodiment.

FIG. 6 is a process flowchart of an exemplary method 600 for determining login endpoints of a web service using heuristics or a special cases list, according to an embodiment. Method 600 includes steps 602, 604, and 606. For ease of explanation, method 600 is described in the context of system 200, particularly browser 115, of FIG. 2. Method 600 begins in step 602, which includes checking the URL of the web service against a special cases list of login endpoints for various web services. For example, the special cases list may comprise pairs of URLs and login endpoints, in which each URL and login endpoint pair corresponds to a different web service. The checking in step 602 may include searching the special cases list for a matching URL that corresponds to a particular web service (e.g., when the user navigates to web service 145 by entering the URL of web service 145 in browser 115). If the matching URL for the web service is found in the special cases list, method 600 proceeds to step 606, which includes using the special case as the determined login endpoint for the web service. However, if the matching URL is not found in the special cases list, method 600 proceeds to step 604, which includes using heuristics to determine the login endpoints. Steps 602, 604, and 606 may be performed by, for example, login form manager 210.

Figure 7:
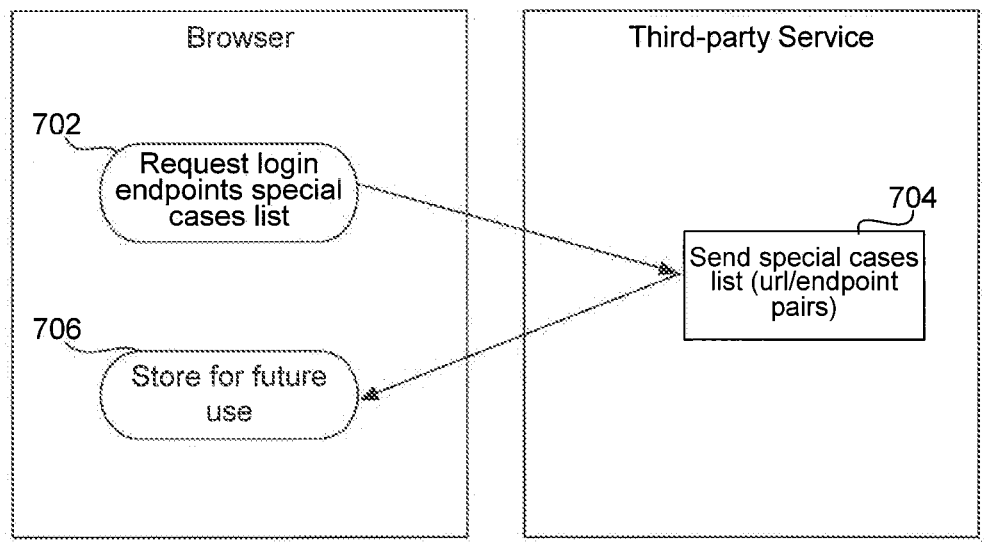
FIG. 7 is a process flowchart of an exemplary method for updating a special cases list of login endpoints using a third-party service, according to an embodiment.

As described above, the special cases list of login endpoints can be retrieved from a third-party service via, for example, network 150. FIG. 7 is a process flowchart of an exemplary method 700 for updating a special cases list of login endpoints using such a third-party service, according to an embodiment. Method 700 includes steps 702, 704, and 706. Method 700 begins in step 702, which includes requesting a special cases list from the third-party service. Step 702 may be performed by, for example, login form manager 210 of FIG. 2 via network 150. In step 504, in response to the request, the special cases list is sent by the third-party service to, for example, login form manager 210. Once the special cases list is received, it is stored for future use in step 506, which may be performed by, for example, login form manager 210. In an embodiment, the third-party service is a cloud-based service, as described above.

Based on the description herein, a person of ordinary skill in the relevant art will recognize that methods 600 and 700 can be executed on any type of client device including, for example and without limitation, a PDA, a laptop or personal computer, and similar types of devices capable of executing a web browser that can access features of web applications/services over a network, such as the Internet.

3. Associating and Storing Login Information

Referring back to FIG. 3, after the login endpoints are determined in step 322, method 300 proceeds to step 324, which includes storing the association between the determined login tokens (step 314), the URL of the web service, the login credentials entered by the user (step 306), and the determined login endpoints (step 322). Step 324 may be performed by, for example, login form manager 210. Method 300 then concludes at step 326, in which the login tokens are added to a login token watch list (e.g., login token watch list 235). Step 326 may be performed by, for example, login form manager 210.

B. Automatically Submitting Login Credentials in the Background

Once the user has been authenticated by submitting the relevant login credentials to the web service and the user has accepted the option to stay logged in to the web service (step 316 of method 300), then the login credentials can be submitted automatically, without the user's intervention, to the web service. As described above, the login credentials are submitted as a background operation or process, in which the actual submission is transparent to the user. Thus, each time a session and login token of the web service expires, the login credentials are automatically submitted to the web service in order to renew or refresh the login token and the session of the web service.

Figure 8:
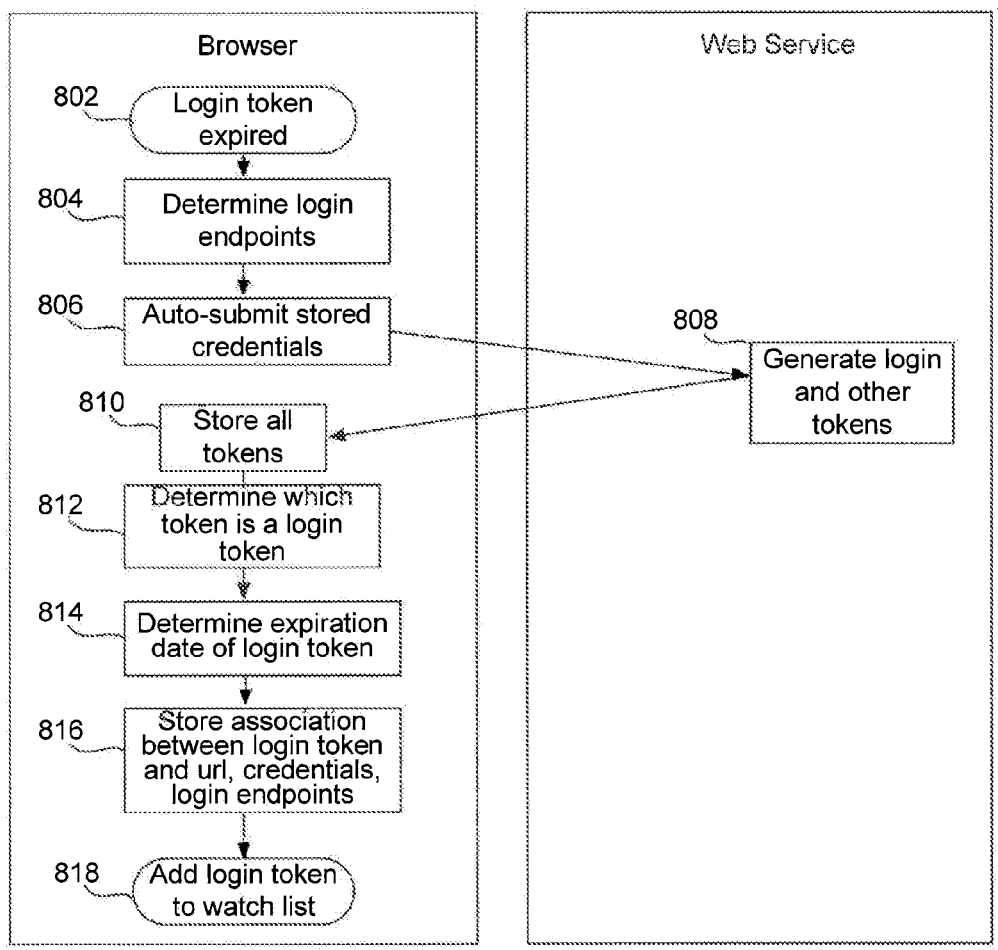
FIG. 8 is a process flowchart of an exemplary method for automatically submitting login credentials as a background process, according to an embodiment.

FIG. 8 is a process flowchart of an exemplary method 800 for automatically submitting login credentials as a background process, according to an embodiment. Method 800 includes steps 802, 804, 806, 808, 810, 812, 814, 816, and 818. One benefit of method 800 is enhancing user experience by enabling users to stay logged in or remain authenticated with a web service/application automatically, without the user's intervention. Further, as method 800 is implemented as a background process that remains transparent to the user, latencies associated with entering login credentials and waiting responses from web services are reduced. Method 800 also makes the user less vulnerable to phishing scams involving web site forgeries with forged login pages.

For ease of explanation, system 200 of FIG. 2, as described above, will be used to describe method 800, but is not intended to be limited thereto. Further, for ease of explanation, steps 802, 804, 806, 810, 812, 814, 816, and 818 will be described in the context of browser 115 of system 200, and step 808 will be described in the context of web service 145 of system 200, but is not intended to be limited thereto. Based on the description herein, a person of ordinary skill in the relevant art will recognize that method 800 can be executed on any type of client device including, for example and without limitation, a PDA, a laptop or personal computer, and similar types of devices capable of executing a web browser that can access features of web applications/services over a network, such as the Internet.

Method 800 begins in step 802, in which a login token corresponding to the web service has expired. The expiration of the login token may be detected by, for example, login token manager 230, as described above. Once it is determined that the login token has expired, method 800 proceeds to step 804, which includes determining one or more login endpoints for the web service. Referring back to method 300 of FIG. 3, particularly to step 324, an association between the login token, a URL, login credentials, and login endpoint(s) corresponding to web service 145 has already been stored (e.g., at client 110 of FIG. 2). Thus, the login endpoints can be determined by accessing the stored association and retrieving the login endpoints associated with the expired login token. Step 804 may be performed by, for example, login form manager 210.

Method 800 then proceeds to step 806, which includes automatically submitting the stored login credentials to web service 145. Similar to step 804, the appropriate login credentials to submit can be determined for step 806 by retrieving the login credentials associated with the expired login token. Step 806 may be performed by, for example, auto-submit module 220. The submitted login credentials are received by web service 145 and thus, method 800 proceeds to step 808, which includes the generation of one or more new tokens, including a new login token, by web service 145. The generated tokens are sent by web service 145 to browser 115 via, for example, network 150. In step 810, the received tokens are saved to memory (e.g., memory of client 110). Step 810 may be performed by, for example, login form manager 210.

Once all of the tokens have been saved, method 800 proceeds to step 812, which include determining which tokens were login tokens. In general, a single login token is generated for a single session of each web service accessed by the user via browser 115. Thus, for example, there may only be one login token corresponding to web service 145 that has been saved. In step 814, the expiration date of the login token for web service 145 is determined. As described above, the expiration date of a session and the associated login token are predetermined or preconfigured by each web service. The expiration date of the login token may be determined in one of various different ways, as described above. For example, referring back to FIGS. 4 and 5, method 400 in combination with method 500 may be used to determine the session and login token expiration dates corresponding to web service 145. Steps 812 and 814 may be performed by, for example, login token manager 230.

Method 800 proceeds to step 816, which includes storing a new association between the login token, URL, login credentials, and login endpoints corresponding to web service 145. Step 816 may include replacing the expired login token in the existing association, as described above, with the new login token. Step 816 may be performed by, for example, login form manager 210. Method 800 concludes in step 818, which includes adding the login token to a login token watch list (e.g., login token watch list 235). Step 818 may be performed by, for example, login token manager 230.

C. Detecting Removal of Login Token Prior to Expiration

Figure 9:
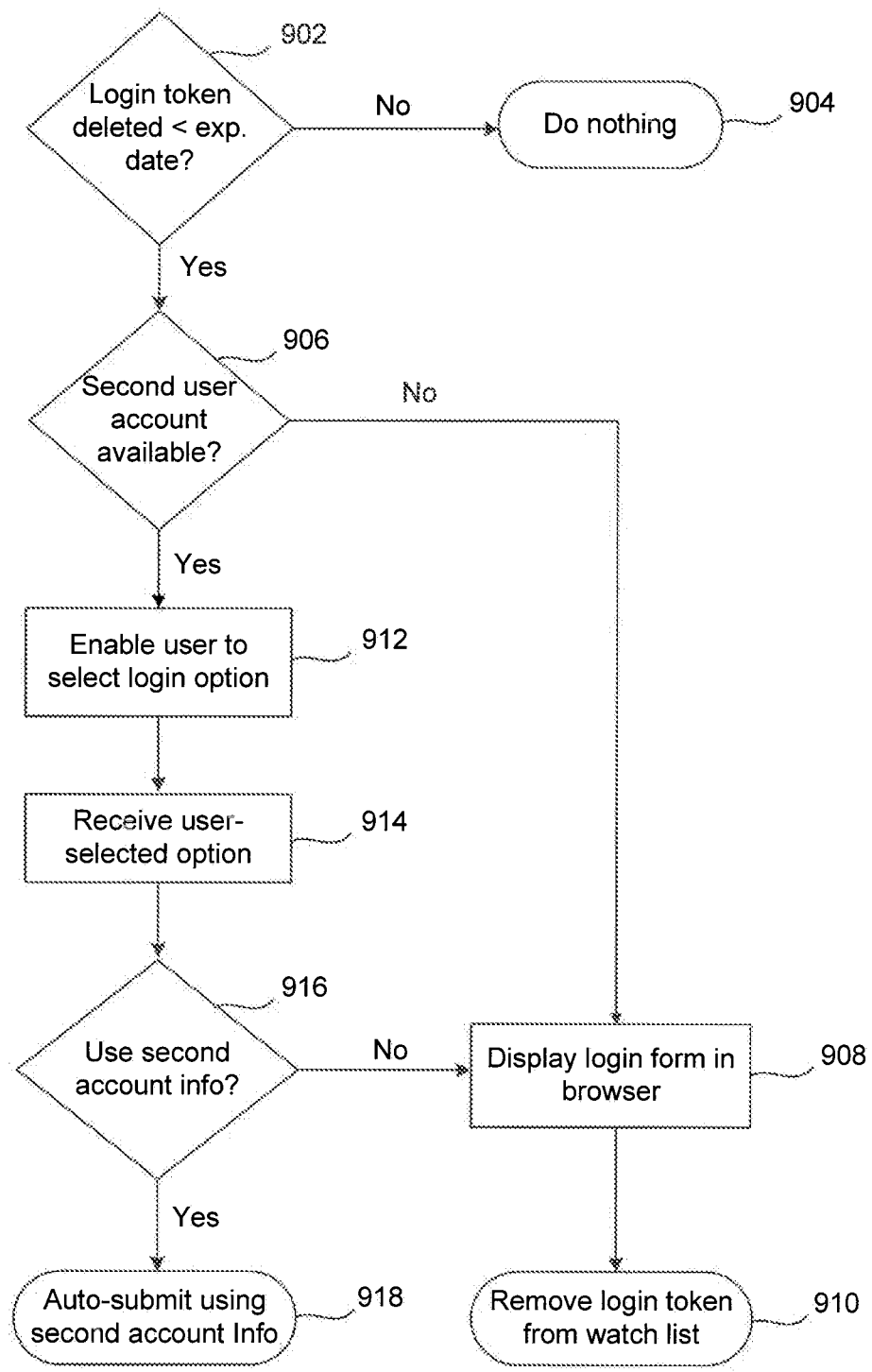
FIG. 9 is a process flowchart of an exemplary method for enabling a user to select second user account information for logging in to a web service upon detection of a removed login token prior to its expiration date, according to an embodiment.

FIG. 9 is a process flowchart of an exemplary method 900 for enabling a user to select second user account information to log in to a web service upon detection of a removed login token prior to its expiration date, according to an embodiment. Method 900 includes steps 902, 904, 906, 908, 910, 912, 914, 916, and 918. One benefit of method 900 is ensuring that login credentials are not automatically submitted if the user has logged out of the web service or has expressed an intent to not have login credentials automatically submitted (e.g., by disabling the auto-submit feature or "stay logged in" setting of the web browser). An additional benefit of method 900 is that it allows the user to stay logged in to the web service using other account information that may also be stored at the user's computing device (e.g., client 110).

For ease of explanation, system 200 of FIG. 2, as described above, will be used to describe method 900, but is not intended to be limited thereto. For further ease of explanation, method 900 will be described in the context of browser 115 and web service 145 of FIG. 2, but is not intended to be limited thereto. Based on the description herein, a person of ordinary skill in the relevant art will recognize that method 800 can be executed on any type of client device including, for example and without limitation, a PDA, a laptop or personal computer, and similar types of devices capable of executing a web browser that can access features of web applications/services over a network, such as the Internet.

Method 900 begin in step 902, which includes detecting whether a login token has been deleted prior to its expiration date. If this has occurred, it may be for one of several reasons relating to the user either logging out of web service 145 or choosing not to have login credentials automatically submitted to the web service (e.g., disabling the auto-submit feature or "stay logged in" setting of the web browser, as previously mentioned). For example, the login token may have been deleted prior to its expiration due to an action taken by web service 145 in response to the user logging out of web service 145 by selecting a log out option or link on a web page of web service 145. The login token is generally deleted by the user's web browser from memory (e.g., memory of client 110). As described above, the login token may also be included in a login token watch list (e.g., login token watch list 235). Further, the login token is removed from the login token watch list if the login token has expired and has not been renewed (i.e., when login credentials have been resubmitted upon login token expiration). Therefore, step 902 may include using the login token in the login token watch list to search for the corresponding login token in memory. Step 902 may be performed by, for example, login token manager 230.

If the login token has not been deleted prior to its expiration date, method 900 concludes at step 904. However, if the login token has been deleted prior to its expiration date, method 900 proceeds to step 906, which includes determining whether login information for a second user account is available. Referring back to FIG. 3, the removed login token was initially generated by web service 145 when login credentials were submitted, as described above in method 300. The login credentials that were submitted are associated with an account the user has registered with web service 145. However, as noted above, the user (or a different user at browser 115) may have one or more additional accounts with web service 145, in which additional login information is associated with the additional account(s). Consequently, there may be additional login credentials associated with another user account that can be used to authenticate the user (or the different user at browser 115). Thus, step 906 may include searching for a second user account that may be stored at, for example, client 110. Step 906 may be performed by, for example, login form manager 210.

If, for example, a second user account is not available, method 900 proceeds to step 908, which includes displaying the login form of web service 145 in the content display area of browser 115. Step 908 may be performed by, for example, login form manager 210. Next, in step 910, the login token is removed from the login token watch list (e.g., login token watch list 235). Step 910 may be performed by login token manager 230.

Alternatively, if a second user account is available, method 900 proceeds to step 912, which includes enabling a login option that allows the user to select whether or not the second account should be used to log in or authenticate the user at web service 145. In step 914, the user selected option is received and in step 916, it is determined whether the user selected to use the second account information or not. Steps 912, 914, and 916 may be performed by, for example, user interface module 240.

If in step 916, it is determined that the user chose not to log in using the second account information, method 900 proceeds back to step 908, followed by 910, described above. However, if it is determined that the user chose to use the second account information, method 900 proceeds to step 918, which includes automatically submitting the login credentials associated with the second user account. Step 918 may be performed by, for example, auto-submit module 220. The login credentials associated with the second user account can now be automatically submitted, without user intervention, as described above. For example, the login credentials may be submitted until the user logs out or deselects automatically submitting login credentials (i.e., the new login token generated by submitting the login credentials associated with the second account are deleted prior to its expiration date). Thus, method 900 can be repeated for additional user accounts stored at, for example, client 110.

VI. Example Computer System Implementation

Embodiments shown in FIGS. 1-9, or any part(s) or function(s) thereof, may be implemented using hardware, software modules, firmware, tangible computer readable media having instructions stored thereon, or a combination thereof and may be implemented in one or more computer systems or other processing systems.

Figure 10:
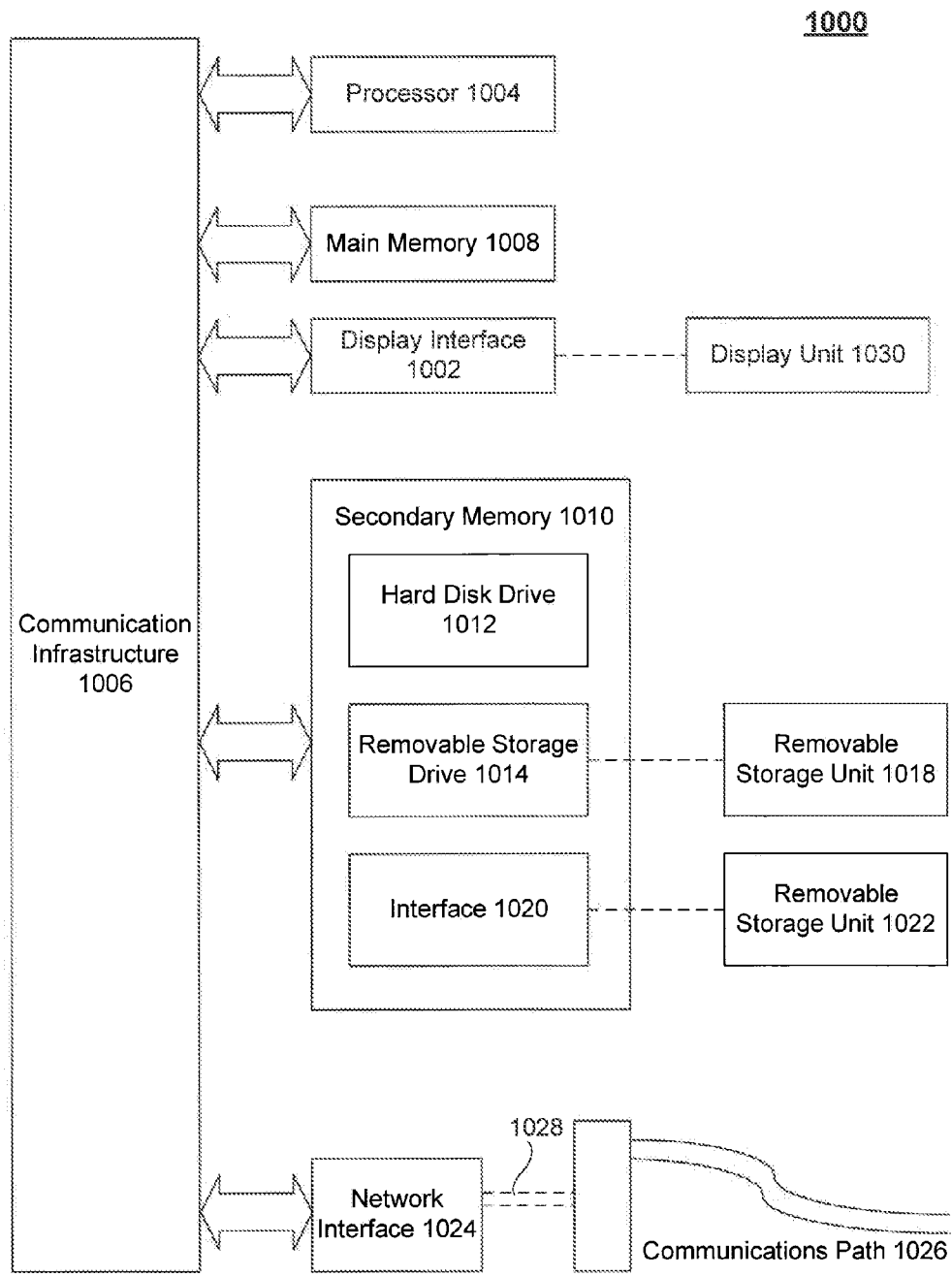
FIG. 10 is a diagram of an example computer system in which embodiments can be implemented.

FIG. 10 illustrates an example computer system 1000 in which embodiments, or portions thereof, may be implemented as computer-readable code. For example, system 200 of FIG. 2, including any components and sub-components thereof, can be implemented in computer system 1000 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-9.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 1000. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general purpose processor device. As will be appreciated by persons skilled in the relevant art, processor device 1004 may also be a single processor in a multi-core/multiprocessor system, such system operating alone, or in a cluster of computing devices operating in a cluster or server farm. Processor device 1004 is connected to a communication infrastructure 1006, for example, a bus, message queue, network, or multi-core message-passing scheme.

Computer system 1000 also includes a main memory 1008, for example, random access memory (RAM), and may also include a secondary memory 1010. Secondary memory 1010 may include, for example, a hard disk drive 1012, removable storage drive 1014. Removable storage drive 1014 may comprise a floppy disk drive, a magnetic tape drive, an optical disk drive, a flash memory, or the like. The removable storage drive 1014 reads from and/or writes to a removable storage unit 1018 in a well known manner. Removable storage unit 1018 may comprise a floppy disk, magnetic tape, optical disk, etc. which is read by and written to by removable storage drive 1014. As will be appreciated by persons skilled in the relevant art, removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 may be in the form of signals, which may be electronic, electromagnetic, optical, or other signals capable of being received by communications interface 1024. These signals may be provided to communications interface 1024 via a communications path 1026. Communications path 1026 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1018, removable storage unit 1022, and a hard disk installed in hard disk drive 1012. Computer program medium and computer usable medium may also refer to memories, such as main memory 1008 and secondary memory 1010, which may be memory semiconductors (e.g. DRAMs, etc.).

Computer programs (also called computer control logic) are stored in main memory 1008 and/or secondary memory 1010. Computer programs may also be received via communications interface 1024. Such computer programs, when executed, enable computer system 1000 to implement the present invention as discussed herein. In particular, the computer programs, when executed, enable processor device 1004 to implement the processes of the present invention, such as the stages in the methods illustrated by flowcharts 300, 400, 500, 600, 700, 800, and 900 of FIGS. 3, 4, 5, 6, 7, 8, and 9 respectively, discussed above. Accordingly, such computer programs represent controllers of the computer system 1000. Where the invention is implemented using software, the software may be stored in a computer program product and loaded into computer system 1000 using removable storage drive 1014, interface 1020, and hard disk drive 1012, or communications interface 1024.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

VII. Variations

As would be understood by a person skilled in the art based on the teachings herein, several variations of the above described features of automatically submitting login credentials as a background process for a user of a web service can be envisioned. These variations are within the scope of embodiments of the present invention. For example, one skilled in the art can envision several variations to tracking login tokens using a login token watch list as in step 326 of method 300 of FIG. 3 and step 818 of method 800 of FIG. 8 (e.g., using login token manager 230 and login token watch list 235 of FIG. 2). For the purpose of illustration only and not limitation, one variation is provided herein.

For example, a variation may include using a persistent client-side certificate that is stored at, for example, client 110 of FIG. 2. Such a client-side certificate is generally associated with a well-known certificate authentication protocol that would be apparent to a person skilled in art given this description. Further, the client-side certificate may be associated with a particular web service (e.g., web service 145 of FIG. 2) and multiple client-side certificates may be stored, where each certificate corresponds to a different web service used by the user at the browser (e.g., browser 115 of FIG. 2). To implement this variation, an association between the client-side certificate, the URL, login credentials, and login endpoints corresponding to the web service may be stored (e.g., in step 324 of method 300). Further, to authenticate the user with the web service, the login credentials associated with the stored client-side certificate may be automatically submitted, without user intervention (e.g., in step 806 of method 800), by, for example, auto-submit module 220 of FIG. 2.

VIII. Conclusion

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system for submitting login credentials in the background for a user of a web service comprising:
   a client device comprising:
   at least one memory;
   a login form manager to store, in the at least one memory at the client device, login information corresponding to a login form of the web service, the login information comprising a login endpoint of the web service and the login credentials, wherein the login credentials are used to authenticate the user for a session of the web service and wherein the login credentials includes first user account information;
   a login token manager to:
      track a login token at the client device, the login token being associated with the session of the web service and including an expiration date for the session of the web service, wherein the login token is separate from the login credentials,
      determine an expiration date for the login token based at least on the expiration date for the session of the web service, wherein the expiration date for the session of the web service is determined using a special cases list, and
      detect whether the login token has been deleted prior to the expiration date;
   wherein, in response to the detection that the login token has been deleted, the login form manager is further configured to determine whether the login credentials include second user account information; and
   an auto-submit module to submit the stored login credentials including the second user account information to the web service, wherein the second user account information is used to authenticate the user for the session of the web service.

2. The system of claim 1, further comprising:
   a user interface module to enable the user to select a login option based on the determined second user account information, to receive the user selected login option, and to display the login form based on the received user selected login option, wherein the login option allows the user to specify the second user account information to authenticate the user for the session of the web service.

3. The system of claim 1, wherein the web service generates the login token and sends the login token to the client device.

4. The system of claim 1, wherein the login token manager is further configured to delete the login token from the client device when the login token expires.

5. The system of claim 1, wherein when the login token expires, the session of the web service expires.

6. The system of claim 5, wherein based on the auto-submit module automatically submitting, after expiration of the login token, the stored login credentials to the web service, the session of the web service is renewed and the user remains authenticated at the web service.

7. The system of claim 5, wherein based on the auto-submit module automatically submitting, after expiration of the login token, the stored login credentials to the web service, the client device receives a new login token, the new login token being associated with a renewed session of the web service and including a new expiration date for the renewed session of the web service.

8. The system of claim 1, wherein the expiration date for the session of the web service is determined using heuristics.

9. A computer-implemented method for submitting login credentials in the background for a user of a web service comprising:
   storing, in at least one memory at a client device, login information corresponding to a login form of the web service, the login information comprising a login endpoint of the web service and the login credentials, wherein the login credentials are used to authenticate the user for a session of the web service and wherein the login credentials includes first user account information;
   tracking a login token at the client device, the login token being associated with the session of the web service and including the expiration date for the session of the web service, wherein the login token is separate from the login credentials;
   determining an expiration date for the login token based at least on the expiration date for the session of the web service, wherein the expiration date for the session of the web service is determined using a special cases list;
   detecting whether the login token has been deleted prior to the expiration date:
   determining, in response to the detection that the login token has been deleted, whether the login credentials include second user account information; and
   submitting the stored login credentials including the second user account information to the web service, wherein the second user account information is used to authenticate the user for the session of the web service.

10. The method of claim 9, further comprising:
    enabling the user to select a login option based on the determining;
    receiving the user selected login option; and
    displaying the login form at the computing device based on the received user selected login option,
    wherein the login option allows the user to specify the second user account information to authenticate the user for the session of the web service.

11. The method of claim 9, further comprising deleting the login token from the client device when the login token expires.

12. The method of claim 9, wherein when the login token expires, the session of the web service expires.

13. The method of claim 12, wherein based on the automatically submitting, the session of the web service is renewed and the user remains authenticated at the web service.

14. The method of claim 12, further comprising:
    receiving a new login token based on the automatically submitting, the new login token being associated with a renewed session of the web service and including a new expiration date for the renewed session of the web service.

15. A system for automatically submitting login credentials in the background for a user of a web service comprising:
    a client device comprising:
    at least one memory;
    a login form manager to store, in the at least one memory, login information corresponding to a login form of the web service, the login information comprising a login endpoint of the web service and the login credentials, wherein the login credentials authenticate the user for a session of the web service using first user account information;
a login token manager to:
  track a login token, the login token associated with the session of the web service and including an expiration date for the session, wherein the login token is separate from the login credentials,
  determine an expiration date of the login token based at least on the expiration date for the session of the web service, wherein the expiration date for the session of the web service is determined using a special cases list, and
  detect whether the login token has been deleted prior to the expiration date for the login token;
wherein the login form manager is configured to:
  determine, if the login token has been deleted, whether the login credentials include second user account information, and
  authenticate the user for the session of the web service using the second user account information; and
an auto-submit module to automatically submit, without user intervention, the stored login credentials to the web service based on the login endpoint and the expiration date of the login token.

16. The system of claim 15, wherein the auto-submit module is configured to automatically submit the stored login credentials to the web service after expiration of the login token.

17. The system of claim 15, wherein when the login token expires, the session of the web service expires.

* * * * *